Figure 1:
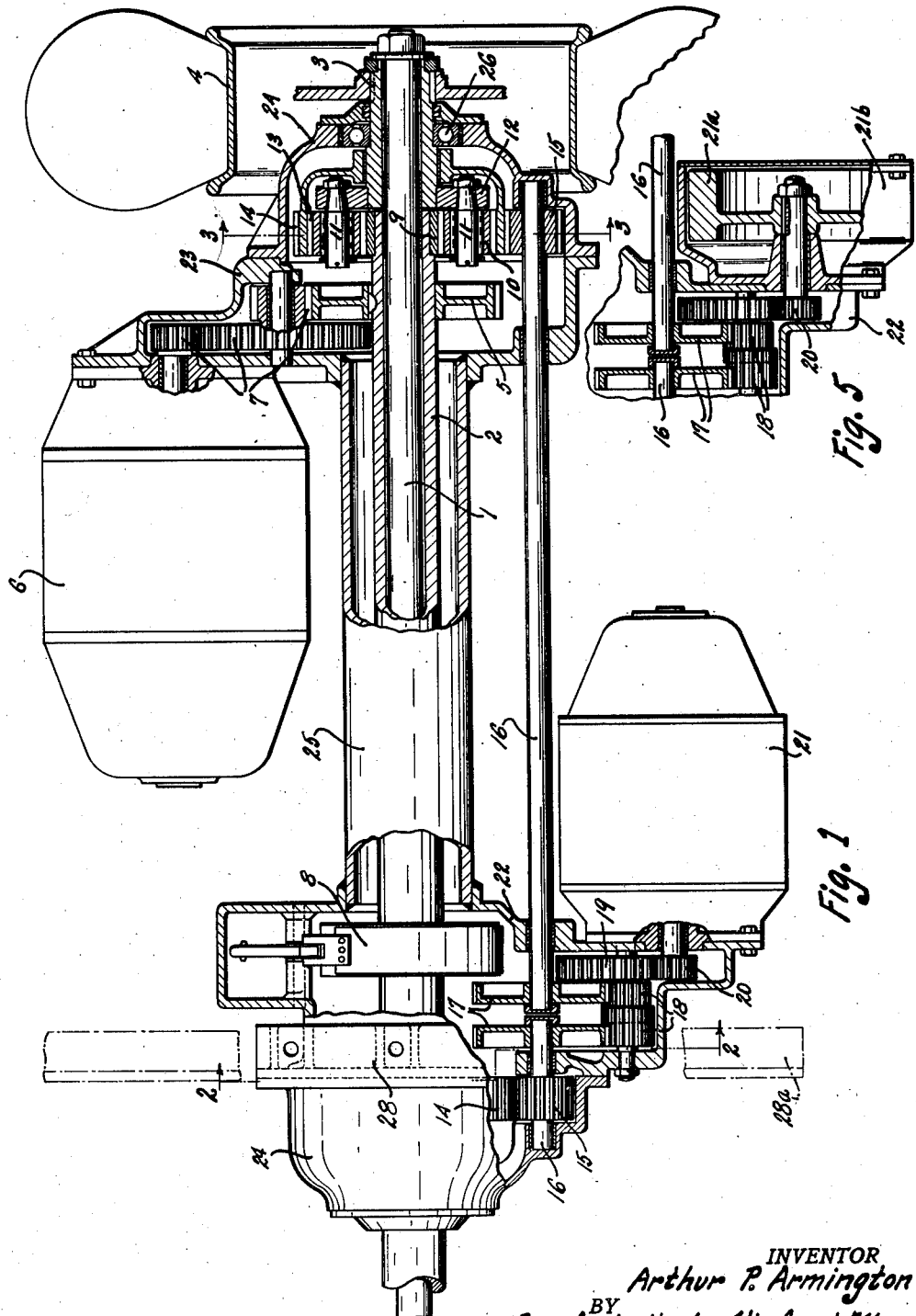

July 7, 1936.   A. P. ARMINGTON   2,047,050
DRIVING AND STEERING AXLE UNIT
Filed Aug. 18, 1933   4 Sheets-Sheet 1

INVENTOR
Arthur P. Armington
BY
Brockett, Hyde, Higley & Meyer
ATTORNEYS

July 7, 1936.  A. P. ARMINGTON  2,047,050
DRIVING AND STEERING AXLE UNIT
Filed Aug. 18, 1933  4 Sheets-Sheet 2
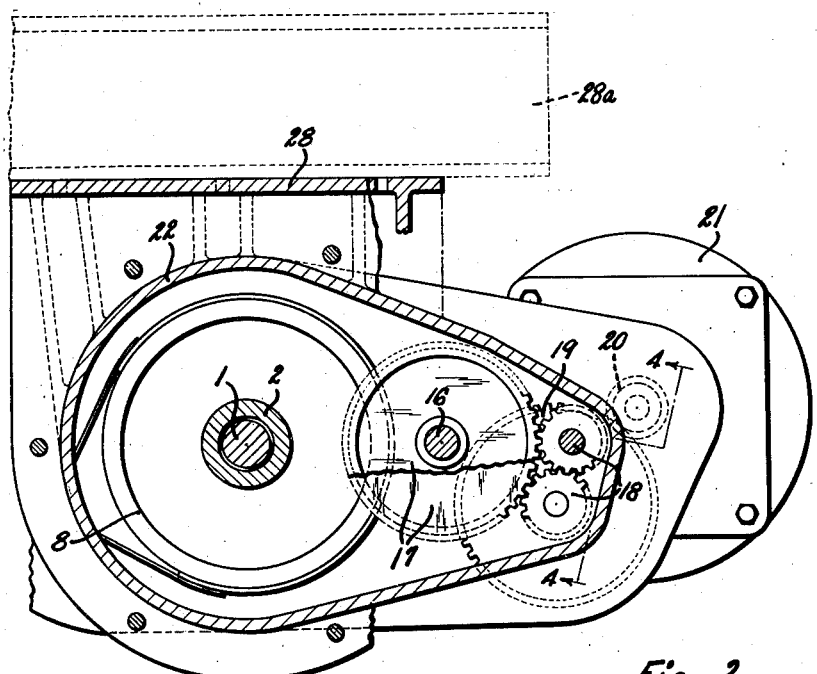
Fig. 2
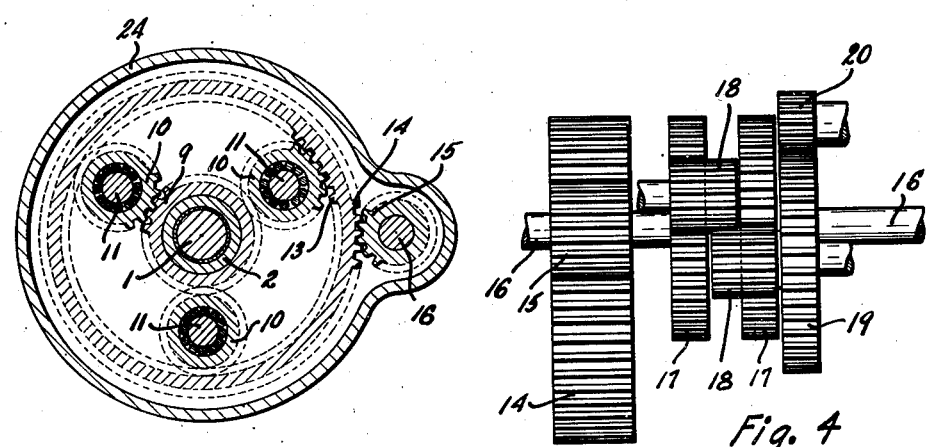
Fig. 3
Fig. 4
INVENTOR
Arthur P. Armington
BY
Brockett, Hyde, Higley & Meyer
ATTORNEYS July 7, 1936.  A. P. ARMINGTON  2,047,050
DRIVING AND STEERING AXLE UNIT
Filed Aug. 18, 1933  4 Sheets-Sheet 3
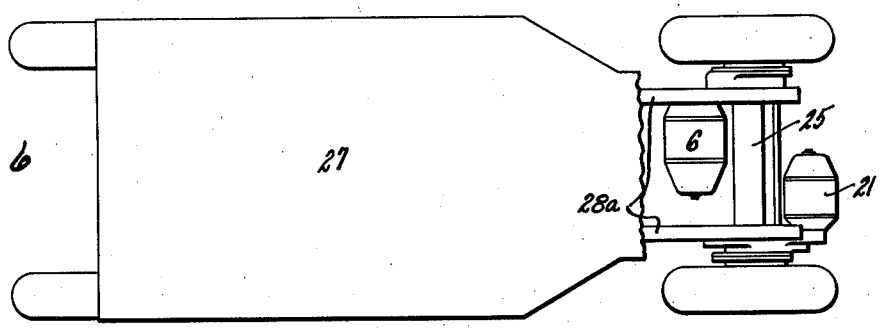
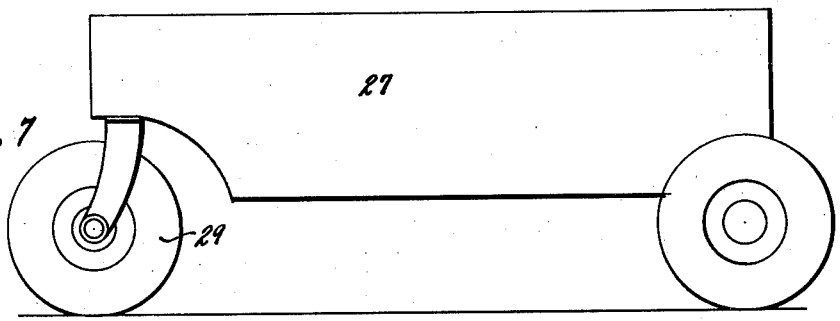
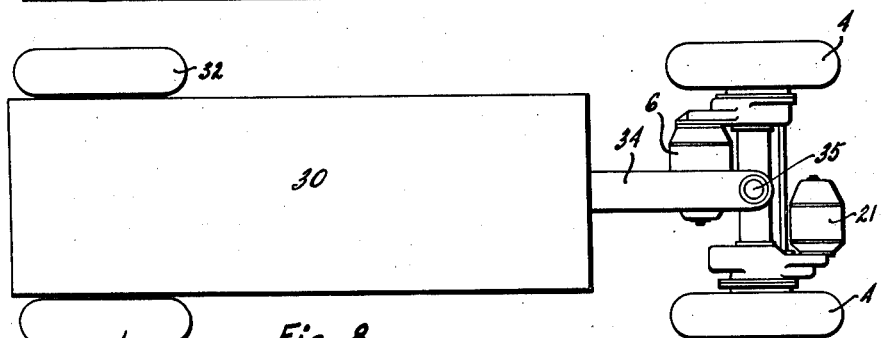
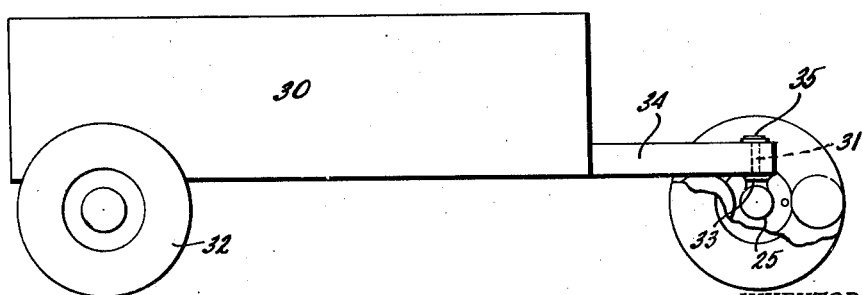
INVENTOR
Arthur P. Armington
BY
Brockett, Hyde, Higley & Meyer
ATTORNEYS

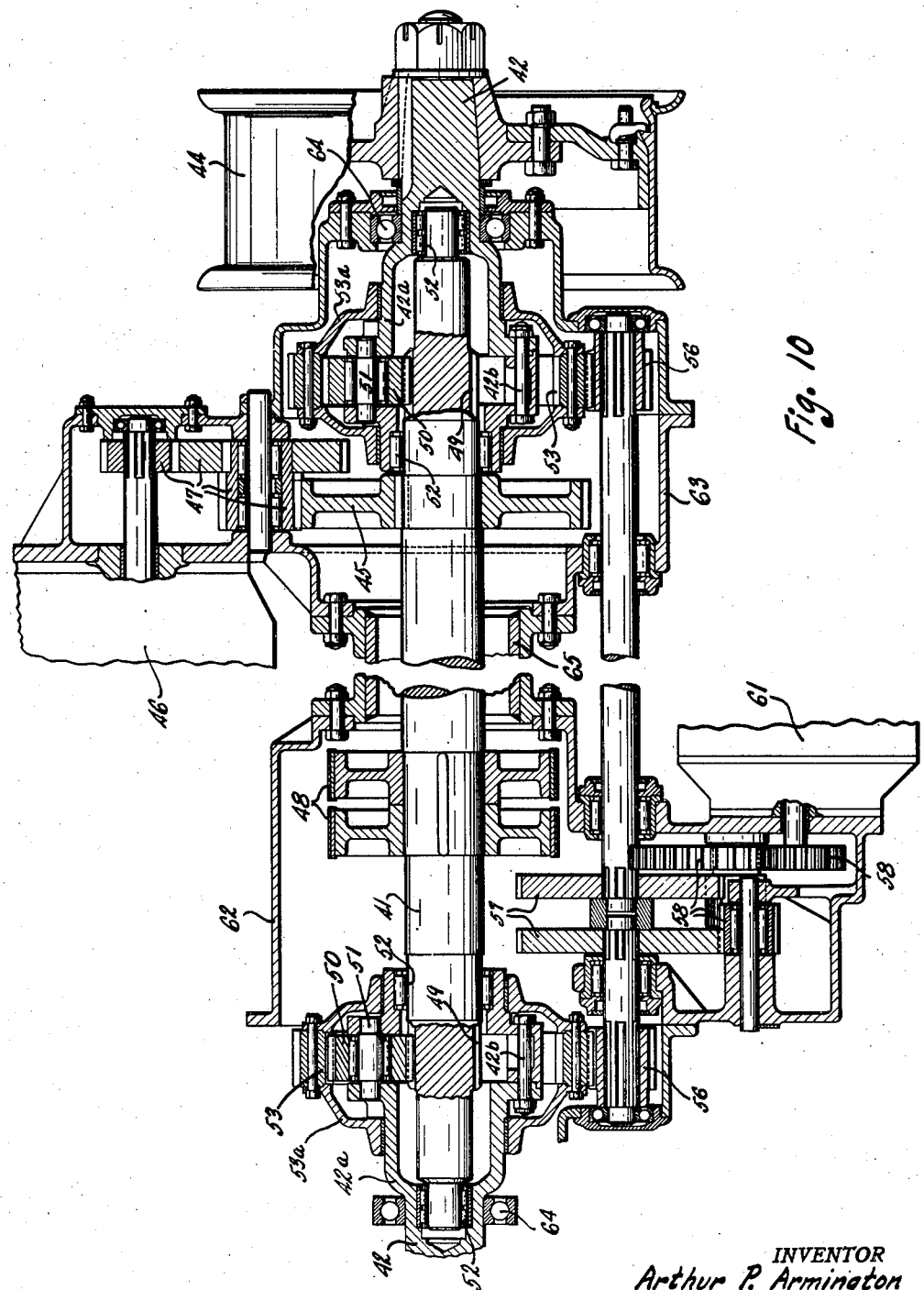

Patented July 7, 1936

2,047,050

UNITED STATES PATENT OFFICE 2,047,050

DRIVING AND STEERING AXLE UNIT

Arthur P. Armington, Willoughby, Ohio, assignor to The Euclid Road Machinery Company, Euclid, Ohio, a corporation of Ohio Application August 18, 1933, Serial No. 685,771

13 Claims. (Cl. 180—17)

This invention relates to driving axles, such as of the type wherein steer is had by control of the drive of the axle means thereon, and more particularly the invention has to do with an electrically driven axle of the class described.

The general object of the invention is to provide a self-contained driving axle unit adapted for quantity production and for substantially universal application in connection with vehicles of various suitable types.

Another object is to provide simple and rugged structure for the purpose, capable of easy assembly and disassembly, and a particular object is to so dispose the parts as to best distribute their weight.

The type of axle contemplated includes differential means effective between the two wheel means of the axle, and the invention includes the provision of an inertia differential lock automatically effective to properly distribute driving and braking forces between the wheels under conditions such as where one wheel is mired, in a highway vehicle, and in going around curves, in a railroad vehicle.

The exact nature of this invention together with further objects and advantages thereof will be apparent from the following description taken in connection with the accompanying drawings, in which Fig. 1 is a plan view illustrating an embodiment of the invention, parts being broken away to show details of construction; Fig. 2 is a detail in transverse section as in the plane of line 2—2, Fig. 1; Fig. 3 is a similar view in the plane of line 3—3, Fig. 1; Fig. 4 is a detail of parts appearing in Fig. 2, taken as in the plane of line 4—4 thereof; Fig. 5 is a detail illustrating a modification of construction appearing in Fig. 1; Figs. 6 and 7 are plan and side elevation respectively illustrating conventionally the application of the invention to one form of vehicle; Figs. 8 and 9 are views corresponding to Figs. 6 and 7 but illustrating another application of the invention; and Fig. 10 is a view corresponding to Fig. 1 but illustrating a modification adapted for heavy duty service.

With reference now to the embodiment of Figs. 1 to 9 of the drawings, 1 is a center shaft and 2 a driving sleeve rotatably mounted thereon. Mounted on the center shaft at either end of the driving sleeve 2, is a sleeve 3 splined at its end as indicated to carry a wheel 4 in driving relation therewith. The wheels 4 in the drawings are indicated as rubber tired, for highway travel, but it will be appreciated that flanged wheels for railway use, or any other kind of treads might be employed as well. The center shaft 1 is provided with nuts at its ends by which it is maintained against relative endwise motion, and the wheels are demountably secured. An important function of the center shaft is to maintain the three sleeves in alignment.

For drive of the sleeve 2 a gear 5 is secured thereon and arranged to have drive by a driving motor 6 through the intermediate gears 7 as indicated. The gear 5 is located adjacent one end of the driving sleeve, at the other end of which is provided a brake conventionally indicated at 8.

Adjacent each end of the driving sleeve 2 and the adjacent wheel-carrying sleeve 3, a differential is arranged, to provide a controlled drive of the wheel-carrying sleeve from the driving sleeve. These differentials are identical, of the planetary spur geared type. Each comprises a center pinion 9 secured on an end of the driving sleeve, a number of planet pinions 10 meshing therewith and carried by stub shafts 11, each stub shaft extending from a yoke 12 secured with the wheel-carrying sleeve 3, and the planet pinions 10 meshing with an internally toothed ring gear 13 mounted for free rotation on the wheel-carrying sleeve.

It is to be observed that each differential includes a pair of input elements differentially related for common drive of a single output element: the input elements comprising the ring gear 13, and the center pinion and associated driving sleeve 2, and the output element comprising the planet pinions 10 and associated wheel-carrying sleeve 3. It will be apparent that operation of the driving motor 6 will effect coincidental drive of the wheels 4, with equal effect upon the wheels if the ring gears 13 be stationary.

The ring gears 13 are interassociated by a third differential arranged to prevent simultaneous rotation of the ring gears in the same direction. For this purpose each ring gear is externally toothed as at 14 to mesh with a pinion 15, the pinion 15 being mounted on aligned shafts 16 as indicated. One of these shafts 16 extends from the far pinion 15 adjacent the brake 8, and at their adjacent ends these shafts carry gears 17, slightly spaced from each other.

Each gear 17 is provided with a pinion 18 with which it meshes, the pinions 18 having intermeshing ends overhanging their gears 17 as indicated, Fig. 4. One of the pinions 18 has an associated gear 19 in driving relation with a pinion 20.

The arrangement of this third differential is such that operation of the pinion 20 will cause operation of the ring gears 13, in opposite directions at relatively low speed. As here shown, a steering motor 21 is arranged to drive the pinion.

The parts are interassociated, to provide support of the motors by the wheels, coincidental drive of the wheels by the driving motor, and concurrent steering components of drive of the wheels by the steering motor, by supporting frame structure in which the described driving structure is housed and in which the moving parts bear. In other words the structure provides rigidly interassociated bearings for the moving parts and in this respect acts as frame means; and, moreover, the structure is arranged to enclose many of the moving parts effective between motors and wheels. This housing and supporting frame structure is generally in the shape of a hollow dumbbell having enlarged end parts 22 and 23 enclosing the driving differentials and associated gearing, and having bell-shaped covers 24 for the purpose, and rigidly interconnected by a central tubular member 25, preferably welded between the housings 22 and 23 as indicated. Each cover 24 is removably secured with its housing member, and has a bearing upon its wheel-carrying sleeve 3, as indicated at 26, shouldered to maintain the sleeve endwise positioned, whereby the entire housing structure comprises a rigid unit having a bearing at each end with the corresponding wheel means.

The driving motor 6 is mounted on the housing enlargement 23 at one end of the axle to project therefrom toward the other end. The steering motor 21 is similarly arranged with respect to the other housing end 22, which encloses the brake means and the third or steering differential. Both motors are thus mounted for efficient cooling, and easy accessibility for inspection, repair or replacement. They are disposed oppositely with respect to the central housing member 25. The steering motor 21 is somewhat smaller than the driving motor 6, but its weight together with that of its associated gearing helps balance that of the driving motor about the center shaft 1, and together with the weight of the brake means provides a substantial balance of weight distribution between the wheel means.

Operation will be as follows, assuming the motors connected with a suitable source of electric power, each subject to a reversing controller.

Operation of the driving motor will effect simultaneous and equal drive of both wheel means, by way of the gearing 7 and driving sleeve 2, and thence by way of the driving differentials. The ring gears 13 of these differentials are effectively prevented from rotation by their connections to the third or steering differential, and the wheel speed will consequently be less than that of the driving sleeve 2, the planet pinions 10 rolling in their ring gears 13. The unit will thus be caused to advance, forwardly or rearwardly, dependent upon the direction of operation of the driving motor. The brake 8 has retarding effect upon both wheel means similarly as the driving motor has driving effect.

Operation of the steering motor 21 will provide a rotation of the wheel means relative to each other in opposite directions, regardless of whether or not the driving motor 6 be operating, actuation of the steering differential by the steering motor actuating the ring gears 13 of the two driving differentials oppositely. Each wheel means thus may receive a component of drive from the driving motor and one from the steering motor. These components have the same direction as to one wheel means and opposite directions as to the other. If the driving motor be running, operation of the steering motor will cause the axle unit to swerve from the straight path of travel. If the driving motor is not running, operation of the steering motor will cause the axle unit to rotate about its vertical center in either direction dependent upon the direction of steering motor operation.

It has been noted that the speed of the ring gears 13 is low, relative to that of the steering motor. The armature of this motor constitutes a mass which, geared up as it is, produces very substantial inertia effect in opposition to relative motion of the two ring gears produced by forces other than within the motor itself. Such forces would occur should an obstruction be met by one wheel. Thus, when the steering motor is not operating, the axle unit will very effectively tend to continue in a straight path under propulsion by the driving motor.

When the unit is applied to a vehicle the source of power for the motors may be external as by way of a trolley line or a third rail, or the vehicle may be independently self-propelled, as by an engine-driven generator carried by the vehicle body.

The axle unit is adapted to application in several principal types of land vehicles, first wherein the vehicle body is rigidly associated with the axle unit as to steering. Such an arrangement is indicated in Figs. 6 and 7 wherein the body 27 is supported upon a frame 28a which frame has non-swinging connection with the axle unit housing. Brackets 28 as shown in Figures 1 and 2, are provided on the axle housing castings 22 and 23 for the purpose of mounting the frame on the axle. The driving and steering axle being secured at one end of the vehicle relative to the body, the opposite end is supported by one or more wheels 29 which are caster mounted with respect to the body. In this vehicle arrangement the characteristic of operation will be that the body will swing as a unit with the axle unit responsive to steering control of the driving wheels 4, the caster wheels 29 permitting swinging motion of the opposite end of the vehicle, which end will thus generally follow the driving end.

The characteristic of another vehicle arrangement is illustrated in Figs. 8 and 9, wherein the vehicle body 30 has pivotal connection as at 31 with the driving and steering axle unit, the rear wheels 32 of the vehicle being mounted on a through axle having no turning relation with the body 30. Here a suitable bracket 33 is provided on the central axle housing member 25, associated with the tongue 34 of the vehicle body as by means including a hitch member 35.

Of course, in either vehicle arrangement, suitable controllers for the motors are provided, and provision made for accommodation of the operator.

The axle unit is also adapted for employment as a driving axle only, without steering control. In such event, as shown in Fig. 5, the armature of the steering motor 21 is replaced by a flywheel 21a secured with the pinion 20, and the motor frame may be replaced by a housing 21b for the flywheel. Such flywheel comprises mass means whose inertia effect upon the two drive wheels is very useful. Suppose one of the drive wheels be mired or otherwise without traction, upon starting of the driving motor 6 the inertia effect of the flywheel will, during accelerating conditions, provide a lock between the two driving wheels causing them to operate together, so that the one having traction will be able to drive the vehicle. Similarly, under decelerating conditions, sudden application of the brake 8 will, because of the inertia differential lock, have substantially equal effect upon both driving wheels although one may be on slippery pavement. Of course, similar effects are had when the steering motor is employed but without electric power being supplied thereto.

When the axle unit is employed in a railway vehicle, with flanged wheels, obviously the same advantages will be had by the differential lock provided, the mass being supplied by a flywheel, instead of the steering motor shown, which would be useless. In such service the differential effect between the two wheels will still permit them sufficient relative motion to travel along usual curved tracks without either wheel slipping on its rail, yet in accelerating and braking, slip between wheels will be opposed.

With reference now to the modification of Fig. 10 of the drawings, 41 is a center drive shaft or live axle having at either end a wheel-carrying spindle or stub axle 42 carrying a wheel 44.

The shaft 41 is arranged to be driven by a driving motor 46 through the intermediate gearing 47 and the gear 45 secured on the drive shaft adjacent one end thereof, the other end of the shaft being provided with brake means conventionally indicated at 48.

Each spindle 42 has an associated planetary differential through which it may have drive from the drive shaft 41; these differentials being identical and of the planetary spur geared type. Each comprises a center pinion 49, effected as here shown by teeth formed upon the drive shaft 41 itself, a number of planet pinions 50 meshing with the pinion 49 and carried by stub shafts 51, the planet pinions 50 meshing with an internally toothed ring gear 53. The stub shafts 51 of the planet pinions are carried by an integral part 42a of the spindle 42 and a corresponding sleeve part secured thereto by bolts 42b located between the stub shafts. Bearing means as at 52 are arranged to be effective between the drive shaft 41 and spindle 42 on opposite sides of the differential gearing. The ring gear 53 is carried by bell members 53a, providing bearing means effective upon the spindle 42 on opposite sides of the differential gearing.

It will be observed that the working relation between the principal parts associated by the differential gears, is as in the preceding form of the invention.

The two ring gears 53 at opposite ends of the drive shaft are interassociated for control by a third differential, as before, each ring gear being externally toothed to mesh with a pinion 56, having gears 57 at their adjacent ends. A steering motor 61, through gearing generally indicated at 58, is arranged for simultaneous rotation of the gears 57 and consequently of the ring gears 53 of the driving differentials, in opposite directions, all generally as before.

Further, the principal parts are interassociated as before, to provide support of the motors by their wheels, coincidental drive of the wheels by the driving motor, and concurrent steering components of the drive of the wheels by the steering motor, by supporting structure in which the described driving structure is housed. This housing and supporting structure is again generally in the shape of a hollow dumbbell having enlarged end parts 62 and 63 enclosing the driving differentials and associated gearing, and in which the wheel-carrying spindles 42 have bearing as at 64, the end parts 62 and 63 being rigidly interconnected by a central tubular member 65.

Obviously operation of the modification of Fig. 10 will be as in the modification of the preceding figures, all as will be appreciated by one familiar with the art, the driving motor 46 driving the wheels 44 in the same direction through the two driving differentials, and the steering motor 61 effecting a steering component of drive of the two wheels in opposite directions through the steering and driving differentials.

What I claim is:

1. A self-contained driving and steering axle unit of the class described comprising a pair of wheels, a driving motor, a steering motor, gearing connecting each motor with both wheels and including a pair of differentials one adjacent each wheel, each differential having an output element in driving relation with its wheel, an input element in driven relation with said driving motor, and a second input element in driven relation with said steering motor, and supporting structure for said gearing and including housings for said differentials and a tubular member connecting said housings, each motor being mounted on one of said housings to extend therefrom toward the other housing, the motors being on opposite sides of said tubular member.

2. A self-contained driving and steering axle unit of the class described comprising a pair of wheels, a driving motor, a steering motor, gearing connecting each motor with both wheels and including a pair of differentials one adjacent each wheel, each differential having an output element in driving relation with its wheel, an input element in driven relation with said driving motor, and a second input element in driven relation with said steering motor, and supporting structure for said gearing and including housings for said differentials and a tubular member connecting said housings, each motor being mounted on one of said housings to extend therefrom toward the other housing, the motors being on opposite sides of said tubular member, said gearing including a steering differential arranged in the steering-motor-supporting housing.

3. A self-contained driving and steering axle unit of the class described comprising a pair of wheels, a driving motor, a steering motor, gearing connecting each motor with both wheels and including a pair of differentials one adjacent each wheel, each differential having an output element in driving relation with its wheel, an input element in driven relation with said driving motor, and a second input element in driven relation with said steering motor, and supporting structure for said gearing and including housings for said differentials and a tubular member connecting said housings, each motor being mounted on one of said housings to extend therefrom toward the other housing, the motors being on opposite sides of said tubular member, said gearing including a steering differential arranged in the steering-motor-supporting housing, and brake means arranged in the same housing to be effective on both wheels.

4. In a vehicle of the class described, a driving and steering axle unit having a pair of wheels and including frame structure means for maintaining aligned relation between said wheels, driving motor means for driving said wheels together and steering motor means for operating said wheels in opposite directions, a vehicle body, hitch means movably connecting said body with said axle frame to provide draft and support of the body by said axle unit and permit turning of the latter relative to the body about an upright axis substantially in the general plane of said axle unit, and wheel means associated with said body for support of the latter at a point removed, longitudinally of said vehicle, from said axle.

5. In a driving and steering axle unit of the class described, a center shaft, a driving sleeve rotatably mounted thereon, wheel-carrying sleeves mounted on said shaft at either end of said driving sleeve, for each wheel-carrying sleeve a planetary differential having a center pinion carried by the driving sleeve, planet pinions secured with the wheel-carrying sleeve to mesh with said center pinion, and a ring gear meshing with said planet pinions and bearing upon their wheel-carrying sleeve, housing means for said gearing and having bearing upon said wheel-carrying sleeves, motor means carried by said housing and including a driving motor and associated means for driving said driving sleeve and a steering motor and associated means for driving said ring gears therefrom simultaneously in opposite directions.

6. In a driving and steering axle of the class described, a center drive shaft, wheel-carrying spindles rotatably mounted on the ends of said shaft, for each spindle a planetary differential having a center pinion mounted on said shaft, planet pinions secured with the spindle to mesh with said center pinion, and a ring gear meshing with said planet pinions and bearing upon its spindle, housing means for said gearing and having bearing upon said spindles, motor means carried by said housing and arranged for drive of said center drive shaft, and means for rotating said ring gears in said housing.

7. In a driving and steering axle of the class described, a center drive shaft, wheel-carrying spindles at the ends of said shaft, for each spindle a planetary differential having a center pinion mounted on said shaft, planet pinions secured with the spindle, and a ring gear meshing with said planet pinions, bearing means effective between said drive shaft and said spindle on opposite sides of said differential, bearing means effective between said ring gear and said spindle on opposite sides of said differential, housing means for said gearing and having bearing upon said spindles, motor means carried by said housing and arranged for drive of said center drive shaft, and means for rotating said ring gears in said housing.

8. In a steer-by-drive axle device for an aligned pair of wheels, power means therefor, for each wheel differential means having three elements comprising an output element arranged to drive said wheel and a pair of input elements, means positively associating said power means with one of the input elements of each differential to provide a common drive to both differentials, brake means for said common drive, and steering means providing for actuation of the other input elements of the differentials in opposite directions and independent of said common drive, whereby said brake means will be equally effective upon both wheels, yet without effect upon said steering means.

9. In a driving axle for a pair of wheels, a pair of differentials one for each wheel, each having differentially related elements including an output element in driven relation with its wheel, each differential having an input element, means for driving said input elements, each differential having a third element, mass means, and a third differential having differentially related elements including an element in operative relation with said mass means and a pair of elements each having operative connection with the third element of one of said pair of differentials.

10. In a driving axle for a pair of wheels, a pair of differentials one for each wheel, each having differentially related elements including an output element in driven relation with its wheel, each differential having an input element, means positively interconnecting said input elements, driving means for said interconnecting means, each differential having a third element, mass means, and a third differential having differentially related elements including an element in driving relation with said mass means and a pair of elements each having operative connection with the third element of one of said pair of differentials.

11. In a driving axle having a wheel at each end, a pair of differentials one for each wheel, each having an output element in driven relation with its wheel, each differential having an input element, means for driving said input elements, each differential having a third element differentially related with its said input and output elements, rotatably mounted mass means, and means differentially interconnecting said mass means with both said third elements to provide actuation of said mass means at speeds proportional to motion between said wheels, and including gearing providing that said speeds shall be high relative to said motion.

12. In a driving axle having a wheel at each end, a pair of differentials one for each wheel, each having an output element in driven relation with its wheel, each differential having an input element, means positively interconnecting said input elements, driving means for said interconnecting means, each differential having a third element differentially related with its said input and output elements, rotatably mounted mass means, and means differentially interconnecting said mass means with both said third elements to provide actuation of said mass means at relatively high speeds proportional to motion between said wheels, and including gearing arranged to increase said speeds relative to said motion.

13. In a self-propelled vehicle, a load-carrying body, driving axle means therefor having wheels at its ends and located adjacent the forward body end, hitch means interconnecting said axle means and body for free relative motion therebetween about a central upright axis in the plane of said axle means, and for support and propulsion of said body by said axle means, wheel means arranged for support of said body rearward of said axle means, said axle means having driving means for its said wheels and including means for operating said wheels simultaneously in opposite directions, to adjust said axle means relative to said body without movement of the latter.

ARTHUR P. ARMINGTON.